United States Patent Office.

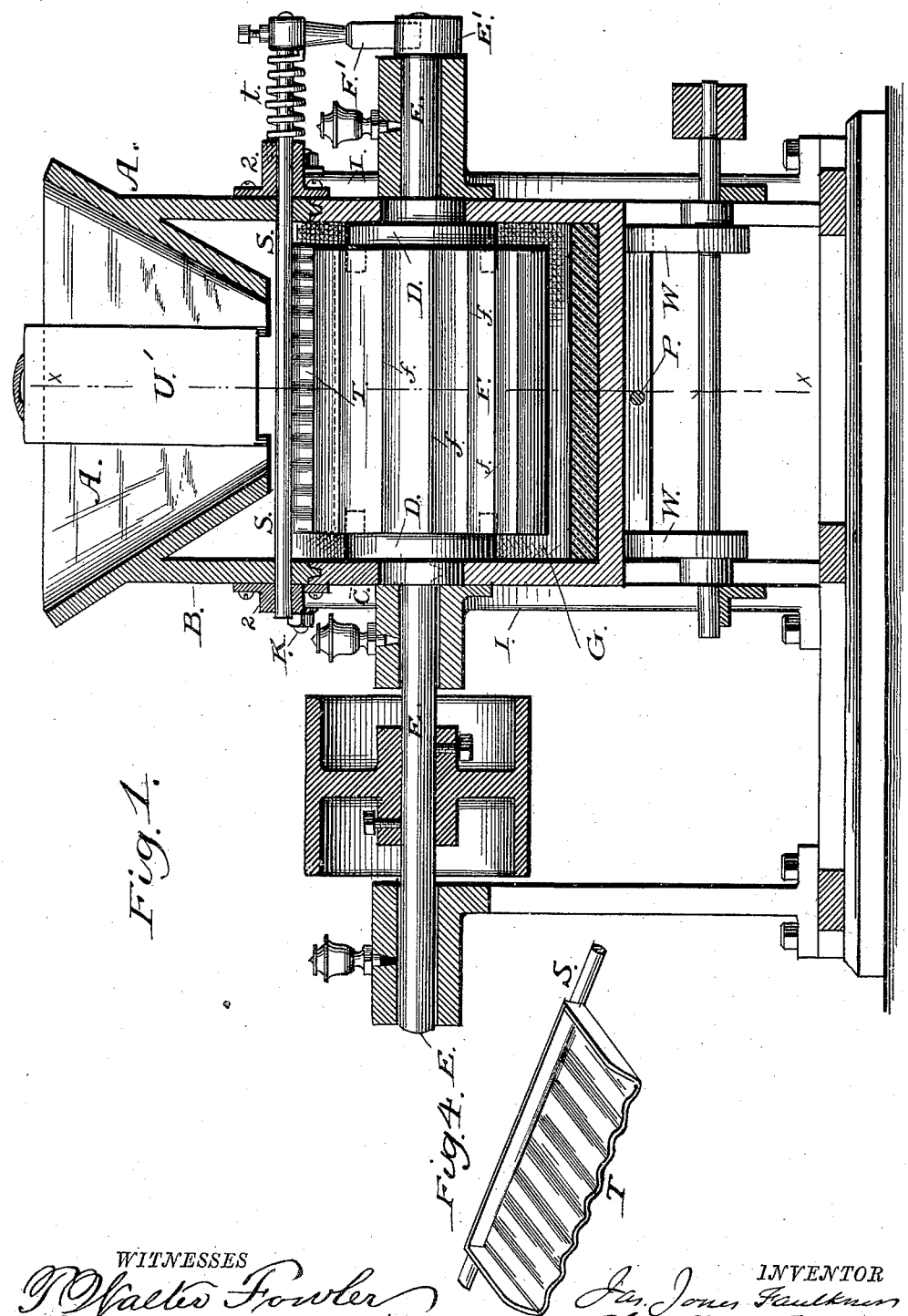

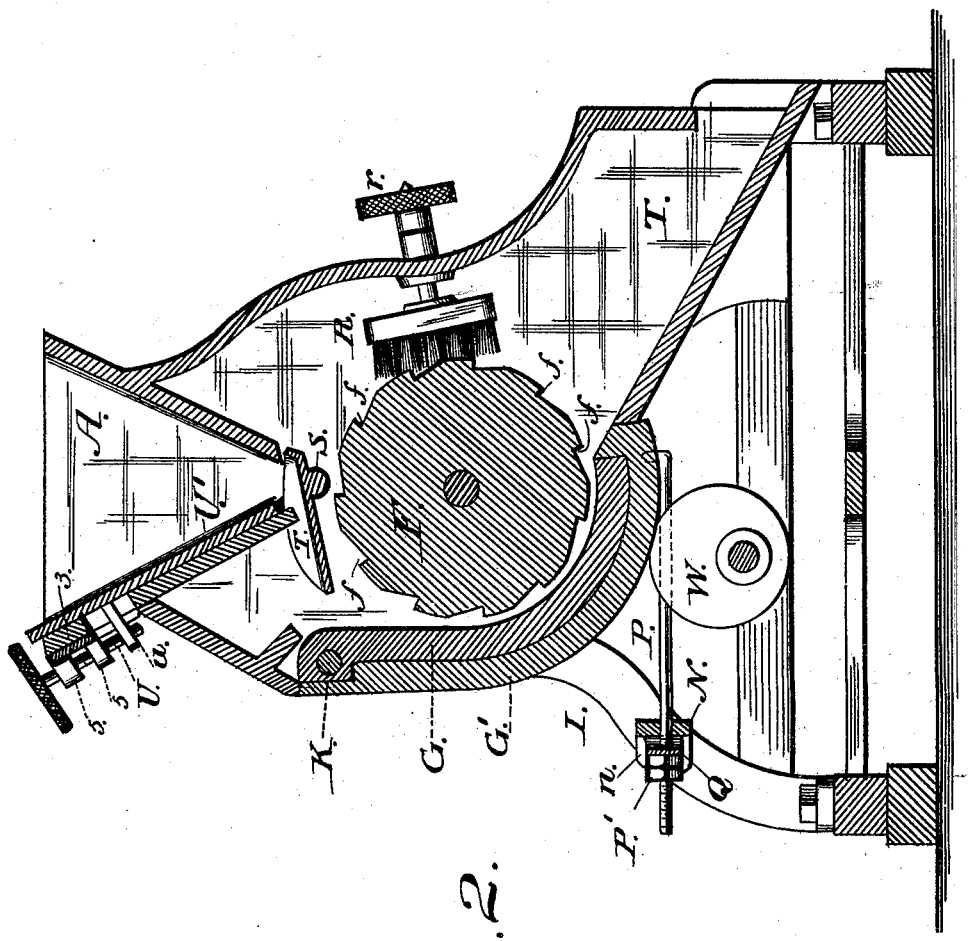

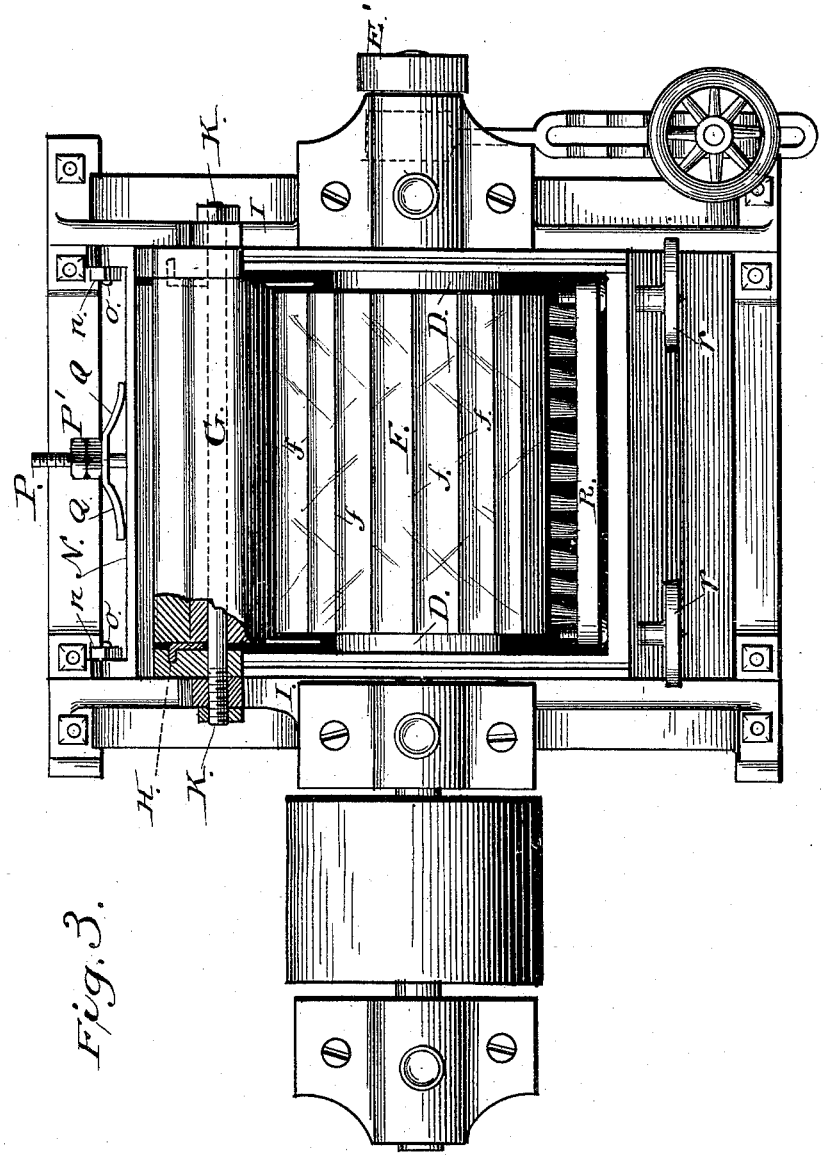

JAMES JONES FAULKNER AND ELZA TAYLOR FAULKNER, OF McMINNVILLE, TENNESSEE.

GRINDING-MILL.

SPECIFICATION forming part of Letters Patent No. 330,880, dated November 24, 1885.

Application filed March 10, 1885. Serial No. 158,340. (No model.)

*To all whom it may concern:*

Be it known that we, JAMES J. FAULKNER and ELZA T. FAULKNER, citizens of the United States, residing at McMinnville, in the county of Warren and State of Tennessee, have invented certain new and useful Improvements in Grinding-Mills, of which the following is a full, clear, and exact description, reference being had to the accompanying drawings, forming part of this specification, in which—

Figure 1 represents a longitudinal sectional view of a grinding-mill embodying our improvements. Fig. 2 represents a cross-sectional view on line $x\ x$ of Fig. 1. Fig. 3 represents a plan view with the hopper removed. Fig. 4 is a detail of the corrugated shoe T.

Our invention relates to grinding-mills, and is an improvement on that disclosed in Letters Patent No. 225,118, granted to JAMES J. FAULKNER, March 2, 1880; and it consists in the peculiar construction and combination of devices which we shall hereinafter describe and claim.

To enable others skilled in the art to make and use our invention, we will now proceed to describe the exact manner in which we have carried it out.

In our improved grinding-mill a stone concave is employed, mounted in a metallic frame pivoted at the upper part in the main frame, so as to be adjustable to and from the grinding-cylinder by a rod and adjusting-nuts. The lower part of the concave frame bears on two eccentrics, W, which thereby retain it against backward movement, while serving the purpose of adjusting the lower edge of the concave to and from the cylinder.

We prefer to operate the eccentrics and the shaft upon which they are mounted by means of the devices shown and described in the patent named, in which the eccentric-shaft has a rigid arm slotted at its end to receive a regulating-screw, which is pivoted at bottom to the frame, and is surrounded by a spiral spring bearing upward on the arms of the eccentric-shaft, and has a nut at its upper end for the accurate adjustment of the arm to vary the distance of the concave from the stone, and thus regulate the grinding. A seat of even bearing is afforded to the nut by means of a bearing-plate, convex at bottom to fit the concave top of a seat-plate, which is flanged or ribbed to seat itself in suitable notches in the lever-arm, so as to regulate the pressure and fix the adjusting devices where they may be set.

In the drawings, A represents a hopper which is furnished with a sliding gate to regulate the feed.

D D are plates secured on a shaft, E, and clamping between them the grinding-cylinder F, the surface of which is grooved with straight furrows $f$, as shown in Fig. 3. Upon the end of shaft E is secured an eccentric, E', adapted to engage an arm, F', on a rod which has attached to it a corrugated shoe, to be hereinafter fully described.

The plates D are formed with annular flanges, which fit in corresponding circular grooves in the ends of the stone. The flanges serve to strengthen the stone and prevent the danger of bursting while in use.

G represents a stone concave mounted in a metallic plate, G', which is pivoted to the frame I by a bolt, K, which, passing through the plate and concave, permits the lower end of said concave to be adjusted toward or from the cylinder F, the bolt K being secured by nuts, as shown.

Between the ends of the concave and the frame of the mill is inserted a rubber cord or other flexible packing, H, (see Fig. 3,) which effectually prevents the escape of grain or other substance while being ground. This flexible packing is secured in place in grooves made to receive it in the casing, but so arranged that the concave may be adjusted without interfering with the packing.

The concave G, instead of being dressed with V-shaped furrows, as is the case in the patent above referred to, has preferably a smooth surface.

Between the sides of the frame is a rocking bar, N, provided with lugs $n$, by means of which and the bolts $o$ the bar is pivoted so as to rock or adjust itself to any degree of the concave's adjustment. This adjustment is accomplished by means of a rod, P, one end of which is attached to the concave, while the opposite end passes through a perforation in the bar N, and is held by adjusting-nuts P'.

Interposed between the nut P' and the bar N is a spring, Q, which keeps the rod pulling on the concave and permits the same to yield.

Located in close proximity to the front face of the cylinder F is a brush, R, the purpose of which is to keep the stone clean and not allow the ground material to be reground by following the stone in its rotation. The brush is adjusted to or from the stone by means of adjusting-screws r, passing through the frame and operated from the outside, as shown in Fig. 3.

Passing longitudinally through the lower end of the hopper, which is provided with sleeves or bearings 2 2, is a rod, S, one end of which carries an arm, F', which engages the eccentric E' on the shaft E, and operates a corrugated shoe or feed-plate, T. A spring, t, interposed between and connected to the arm F' and bearing 2, immediately closes the feed-aperture in the bottom of the hopper after the eccentric has opened said aperture and the requisite amount of ground material has been discharged into the spout T. The hopper is also provided with a casting, 3, having outwardly-extending lugs 5, which furnish bearings for a screw, U. A sliding gate, U', provided with a lug, u, passing through a slot in the hopper and casting 3, engages the screw and regulates the size of the feed-aperture.

Having thus described our invention, what we claim as new, and desire to secure by Letters Patent, is—

1. The combination, with a pivotally-secured concave, of a rod attached to said concave, a rocking bar, N, secured to the frame, adjusting-nuts P', a spring, Q, and a grinding-cylinder, substantially as herein described.

2. The combination, with the hopper, of the corrugated shoe T, rod S, spring t, arm F', and shaft E, having eccentric E', substantially as described.

JAMES JONES FAULKNER.
ELZA TAYLOR FAULKNER.

Witnesses:
JOHN McGUIRE,
JNO. G. MARBURY.